US006857063B2

(12) United States Patent
Moyer

(10) Patent No.: US 6,857,063 B2
(45) Date of Patent: Feb. 15, 2005

(54) DATA PROCESSOR AND METHOD OF OPERATION

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 628 days.

(21) Appl. No.: 09/779,886

(22) Filed: Feb. 9, 2001

(65) Prior Publication Data

US 2002/0112149 A1 Aug. 15, 2002

(51) Int. Cl.$^7$ .............................. G06F 9/34; G06F 9/32
(52) U.S. Cl. ...................................... 712/236; 712/243
(58) Field of Search .............................. 712/236, 237, 712/238, 240, 242, 243, 245, 232, 233, 234, 220, 223, 230; 717/118, 148

(56) References Cited

U.S. PATENT DOCUMENTS

| | | | |
|---|---|---|---|
| 3,571,804 A | * | 3/1971 | Hemdal et al. ............. 712/242 |
| 4,755,935 A | * | 7/1988 | Davis et al. ................ 712/233 |
| 5,434,985 A | | 7/1995 | Emma et al. |
| 5,632,028 A | * | 5/1997 | Thusoo et al. ................ 703/26 |
| 6,009,261 A | * | 12/1999 | Scalzi et al. .................... 703/26 |
| 6,021,273 A | | 2/2000 | Griesemer ................. 395/705 |
| 6,070,220 A | | 5/2000 | Katayama ................... 710/264 |
| 6,148,437 A | | 11/2000 | Shah et al. ..................... 717/4 |
| 6,170,998 B1 | * | 1/2001 | Yamamoto et al. ......... 717/154 |
| 6,233,678 B1 | * | 5/2001 | Bala ........................... 712/240 |

FOREIGN PATENT DOCUMENTS

| | | |
|---|---|---|
| EP | 0 221 577 A2 | 5/1987 |
| WO | WO 99/31579 | 6/1999 |

OTHER PUBLICATIONS

Stallings, Willian, "Computer Organization and Architecture", pp. 581–583, 5th edition, 1999.*
PCT Written Opinion.
PCT/US01/50776 PCT Search Report mailed Aug. 14, 2002.
European Patent Office, IBM Technical Disclosure Bulletin, Apr. 1983.

* cited by examiner

Primary Examiner—Henry W. H. Tsai
(74) Attorney, Agent, or Firm—Robert L. King; Susan C. Hill

(57) ABSTRACT

A data processor executes an instruction (JAVASW) to implement efficient interpreter functionality by combining the tasks of table jumps and thread or task switching which is controlled by a running value such as a counter or a timer. Execution of the instruction always requires a change of flow to be taken. In one form, the instruction may cause a hardware accelerator to be signaled to complete instruction execution. Additionally, a memory table containing emulation code correlated to specific byte codes may be compressed for a large number of identified byte codes by the use of separate storage. Further, use of a same portion of the memory table may occur in connection with execution of different bytecodes. While discussed in the context of Java bytecodes, the instruction is applicable to any programming language and processor architecture.

23 Claims, 7 Drawing Sheets

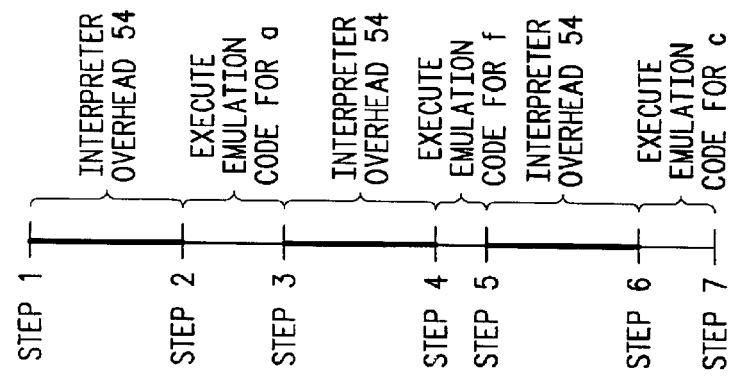
*FIG.3* —PRIOR ART—
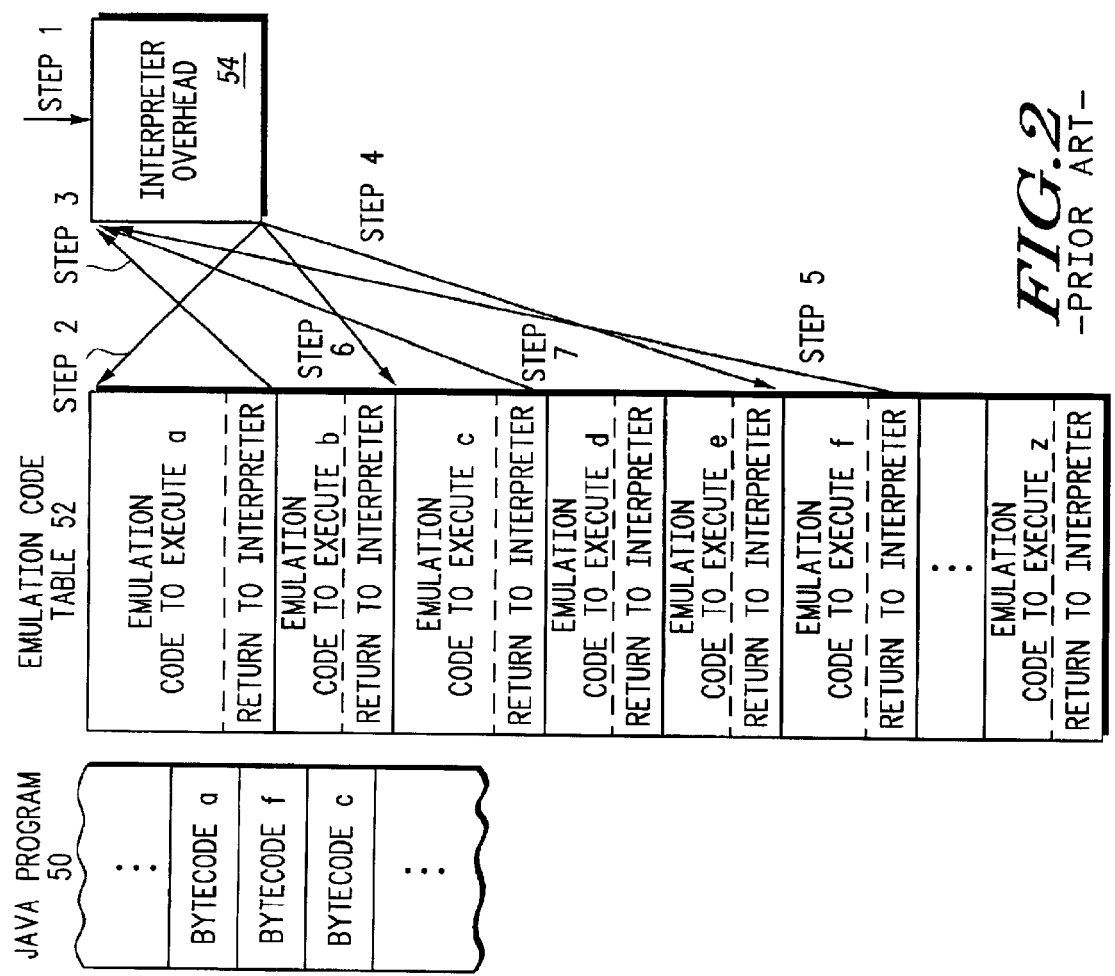
*FIG.2* —PRIOR ART—

JAVASW  JAVA INTERPRETER SWITCH

OPERATION: JUMP TO BYTECODE EMULATION SEQUENCE;
    91 — IF (SWCOUNT!<0)
    92 — PC<-[((PC+2) & 0xffffe000) | (R4<<5)];
    93 — ELSE
    94 — PC<-[((PC+2) & 0xffffe000) | (0x8)];
    95 — SWCOUNT--;

ASSEMBLER
SYNTAX:     JAVASW RX

DESCRIPTION: JUMP TO BYTECODE EMULATION SEQUENCE. THE LOW ORDER 13 BITS OF THE VALUE OF PC+2 ARE FORCED TO ZERO, AND BASED ON THE STATE OF THE SWCOUNT (IN REGISTER R12), EITHER A SCALED VALUE IN REGISTER RX IS LOGICALLY "OR'ED", OR A CONSTANT VALUE 0x8 OR'ED, AND INSTRUCTION EXECUTION RESUMES AT THE NEW PC VALUE. THE SWCOUNT REGISTER R12 IS DECREMENTED. NOTE THAT BECAUSE PC+2 IS USED AS THE BASE VALUE, A JAVASW INSTRUCTION SHOULD NOT BE USED IN THE LAST INSTRUCTION OF INSTRUCTION GROUP 255.

CONDITION CODE:   INAFFECTED

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 1 | 1 | 0 | 0 |

INSTRUCTION FIELDS:

JAVA INTERPRETER SWITCH SUPPORT IS PROVIDED BY THE JAVASW INSTRUCTION. THIS INSTRUCTION CAUSES CONTROL FLOW TO BE DIRECTED INTO A TABLE OF INSTRUCTION GROUPS. MOST GROUPS CONSISTS OF 16 INSTRUCTIONS AND CORRESPOND TO A SINGLE JAVA BYTECODE.

*FIG. 7*

DATA PROCESSOR AND METHOD OF OPERATION

FIELD OF THE INVENTION

The present invention relates to data processing systems, and more particularly, to systems having a software interpreter that implements execution of data processing instructions.

BACKGROUND OF THE INVENTION

The Java programming language is an object-oriented high level programming language developed by Sun Microsystems Inc. and designed to be portable enough to be executed on a wide range of computers ranging from small personal computers up to supercomputers. Computer programs written in Java (and other languages) may be compiled into virtual machine instructions for execution by a Java Virtual Machine (JVM). In general, the Java virtual machine is an interpreter that decodes and executes the virtual machine instructions.

The virtual machine instructions for the Java virtual machine are bytecodes, meaning they include one or more bytes. The bytecodes are stored in a particular file format called a "class file." In addition to the bytecodes, the class file includes a symbol table as well as other ancillary information.

A computer program embodied as Java bytecodes in one or more class files is platform independent. The computer program may be executed, unmodified, on any computer that is able to run an implementation of the Java virtual machine. The Java virtual machine is a software emulator of a "generic" computer, which is a major factor in allowing computer programs for the Java virtual machine to be platform independent.

The Java virtual machine is commonly implemented as a software interpreter. Conventional interpreters decode and execute the virtual machine instructions of an interpreted program one instruction at a time during execution. Compilers, on the other hand, transform virtual machine instructions into native machine instructions prior to execution so that decoding is not performed on virtual machine instructions during execution. Because conventional interpreters repeatedly decode each instruction before it is executed each time the instruction is encountered, execution of interpreted programs is typically quite slower than compiled programs since the native machine instructions of compiled programs can be executed on the native machine or computer system directly.

As a software interpreter must be executing in order to decode and execute an interpreted program, the software interpreter consumes resources (e.g., memory) that will no longer be available to the interpreted program. This is in contrast to compiled programs that execute as native machine instructions so they may be directly executed on the target computer and therefore generally require fewer resources than interpreted programs.

Accordingly, there is a need for new techniques for increasing the execution speed of computer programs that are being interpreted. Additionally, there is a need to provide interpreters that are efficient in terms of the resources they require.

Many embedded devices are becoming Java enabled due to the platform independent and ubiquitous nature of the Java language and development of Java Virtual Machine implementations. Many low cost embedded systems desire to implement the Java processing function as a JVM to avoid the hardware overhead of a dedicated Java processor or a hardware accelerator (for example, a separate co-processor). A straightforward approach to implementing the JVM and executing a Java program is through the use of a software interpreter.

The interpreter implements a software version of a processor in the sense that it performs the standard functions of instruction fetch, decode, and execute of the interpreted instruction stream. The interpreter typically is implemented as a program loop that iterates the fetch, decode, and execute steps.

As Java instructions (bytecodes) are fetched, the interpreter maintains a virtual program counter (the Java PC), and the decoding of each interpreted Java instruction is performed by a large case statement (switch statement) with clauses corresponding to each binary encoding of the bytecode. Code within each clause performs the actual operation defined by the bytecode.

There is overhead associated with processing each bytecode since the bytecode must be fetched and decoded. The overhead associated with the fetch and decode portions of the sequence can be a large percentage of overall execution time, since many Java instructions (bytecodes) perform simple operations.

Since the Java environment supports the notion of multiple threads of execution, an additional function of the interpreter loop is to maintain a counter that is used in determining when a thread (or task) switch should occur.

In some implementations of a Java Virtual Machine, the threadswitch determination is based on the number of Java bytecodes executed. By keeping a counter value which is modified each time the interpreter loop executes, and comparing it to a predetermined value, the interpreter implements the thread switch logic as well. Maintaining the counter and determining when to threadswitch also creates significant overhead. This overhead significantly limits the operating efficiency of the software interpreter.

BRIEF DESCRIPTION OF THE DRAWINGS

Illustrated in FIG. 1 in block diagram form is an illustrative data processing system;

Illustrated in FIG. 2 is a known code sequence showing execution flow when a Java program is executed;

Figure 1:
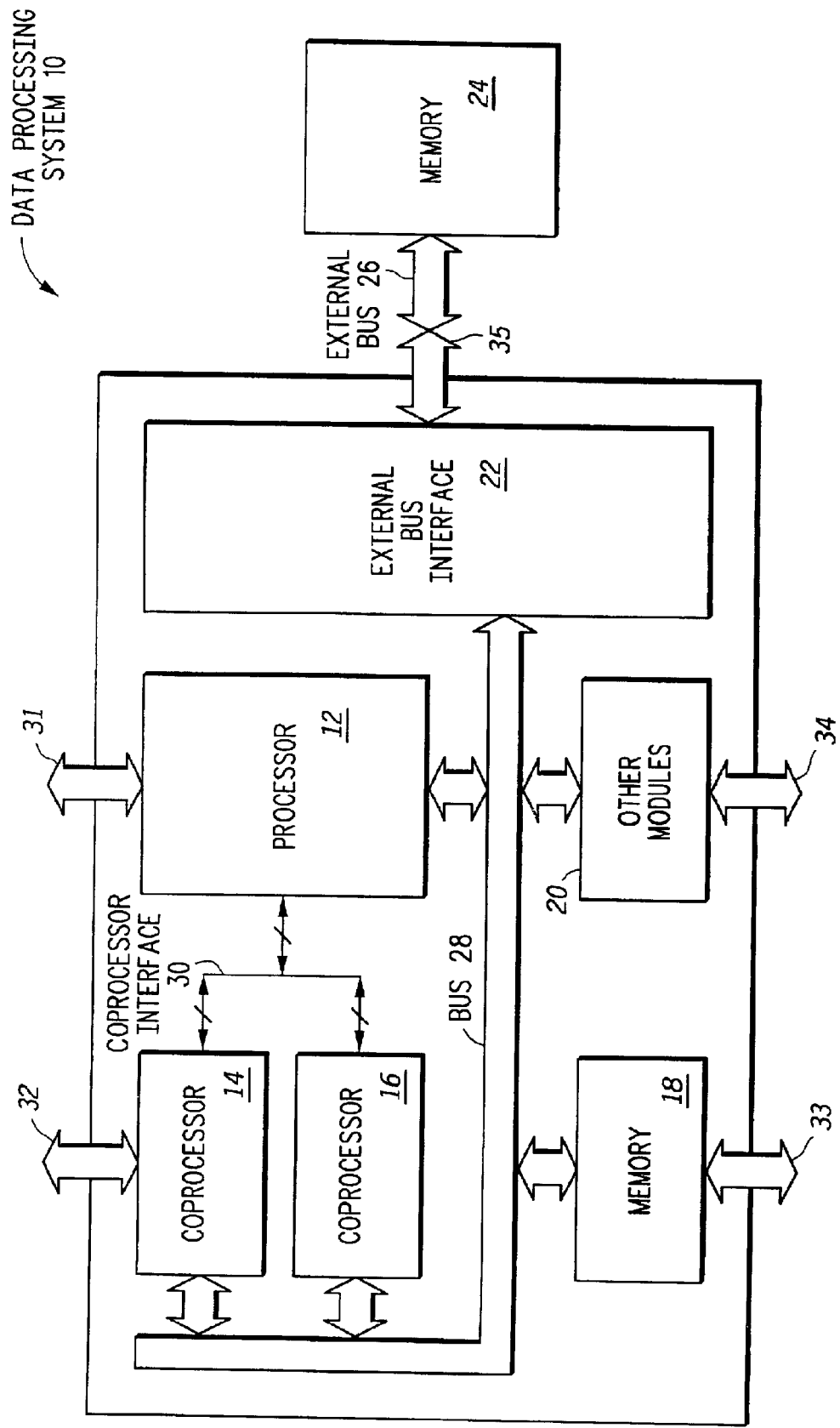
Figure 5:
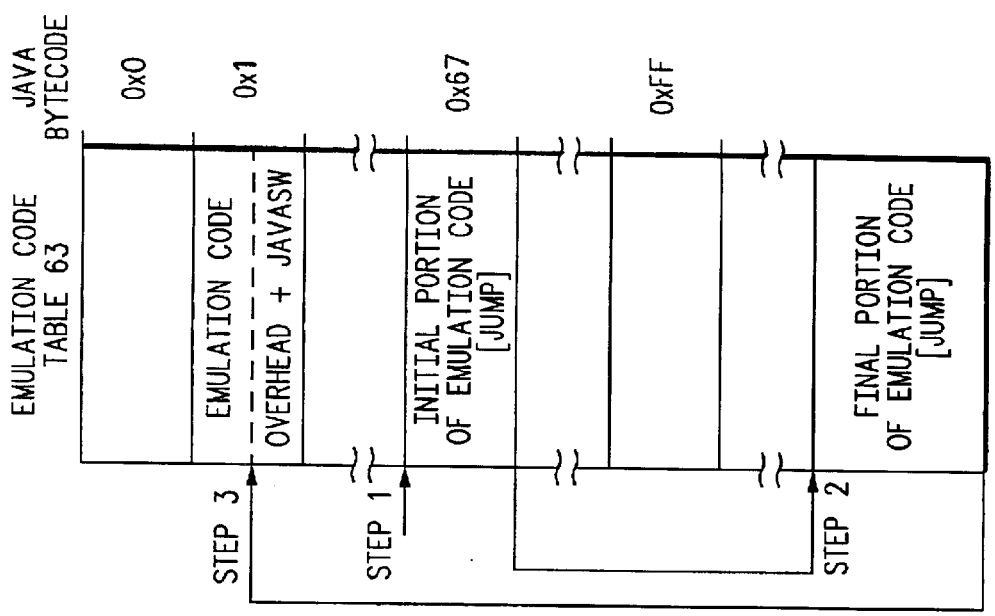
Figure 4:
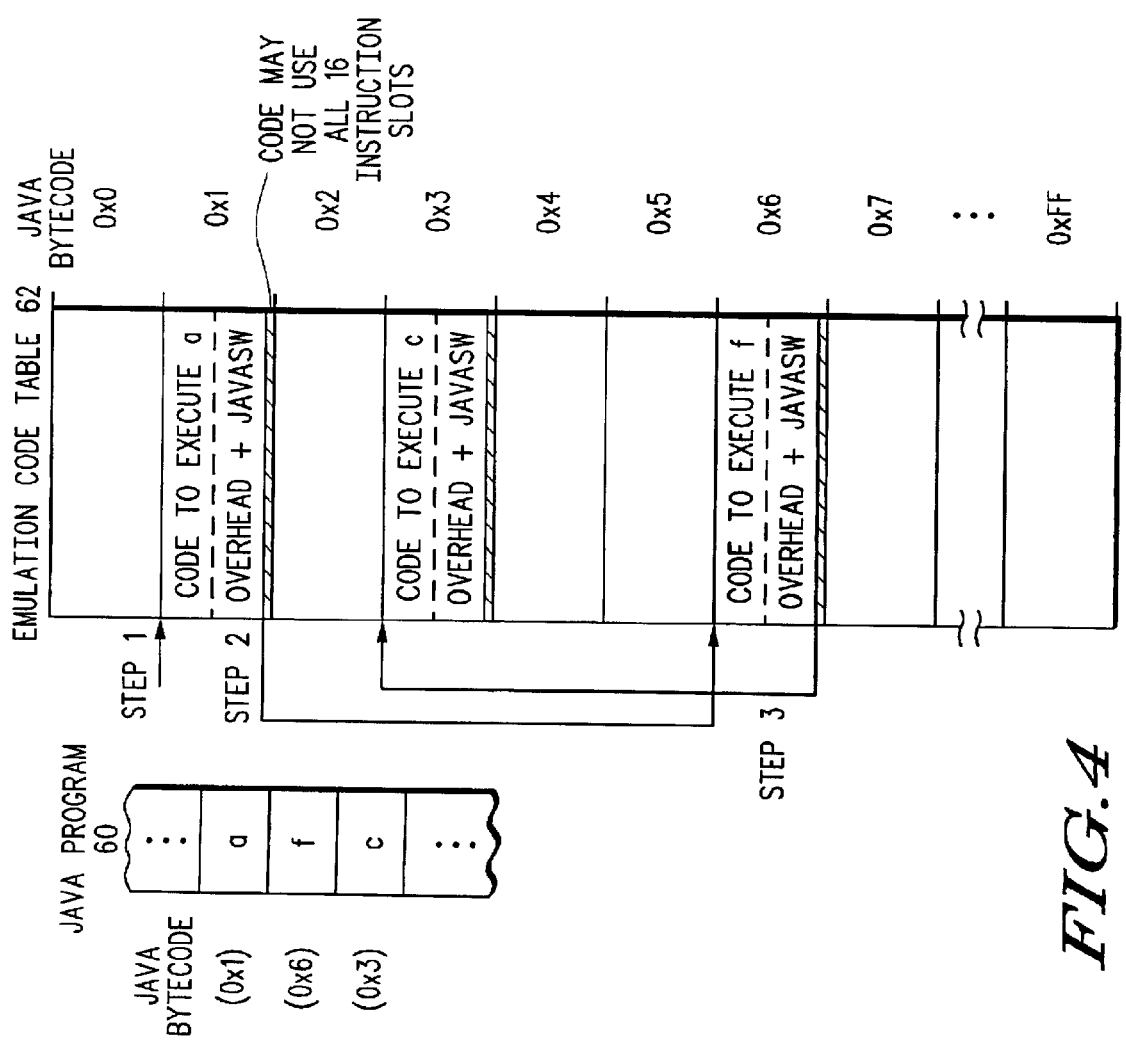
Figure 6:
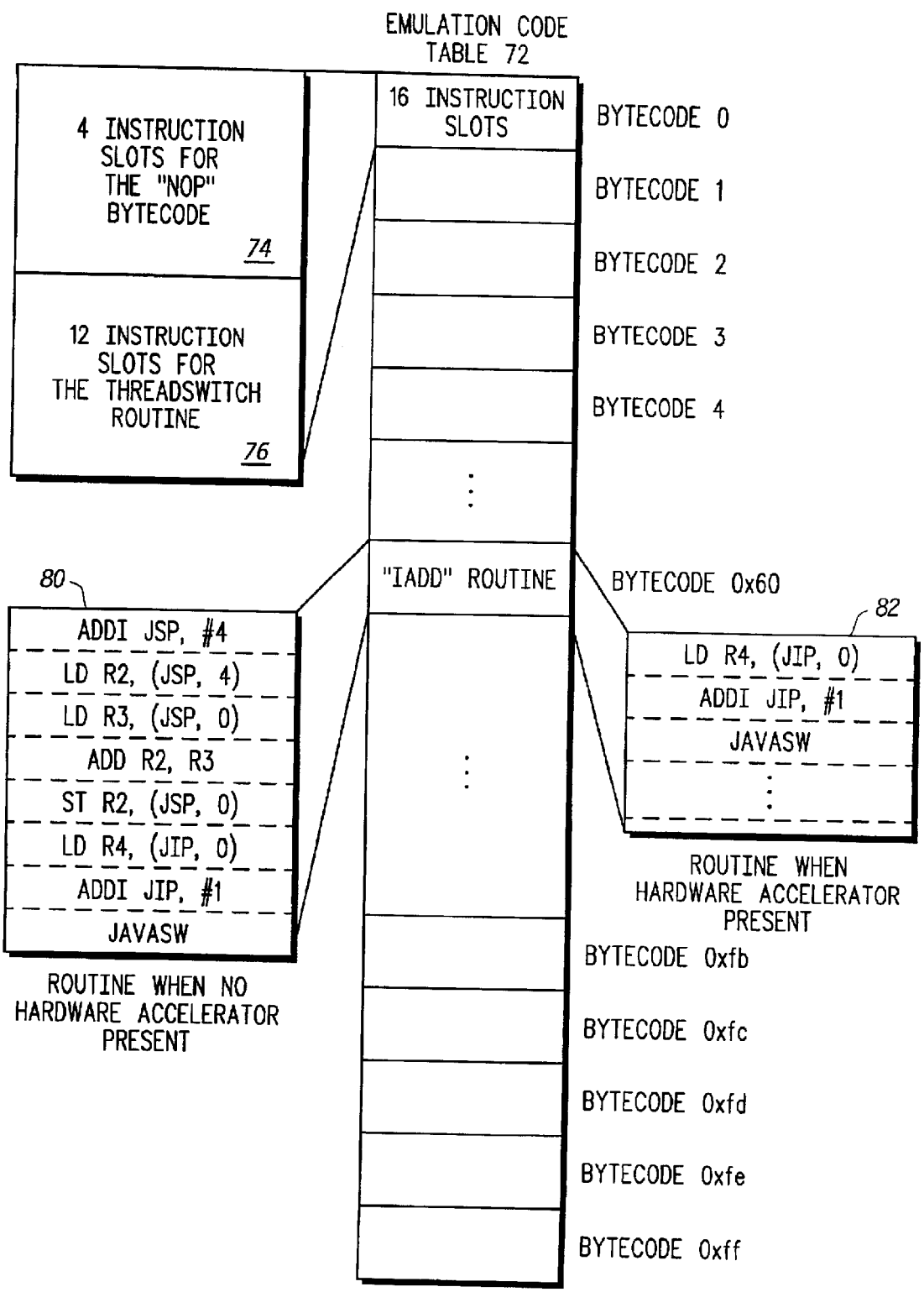
Figure 8:
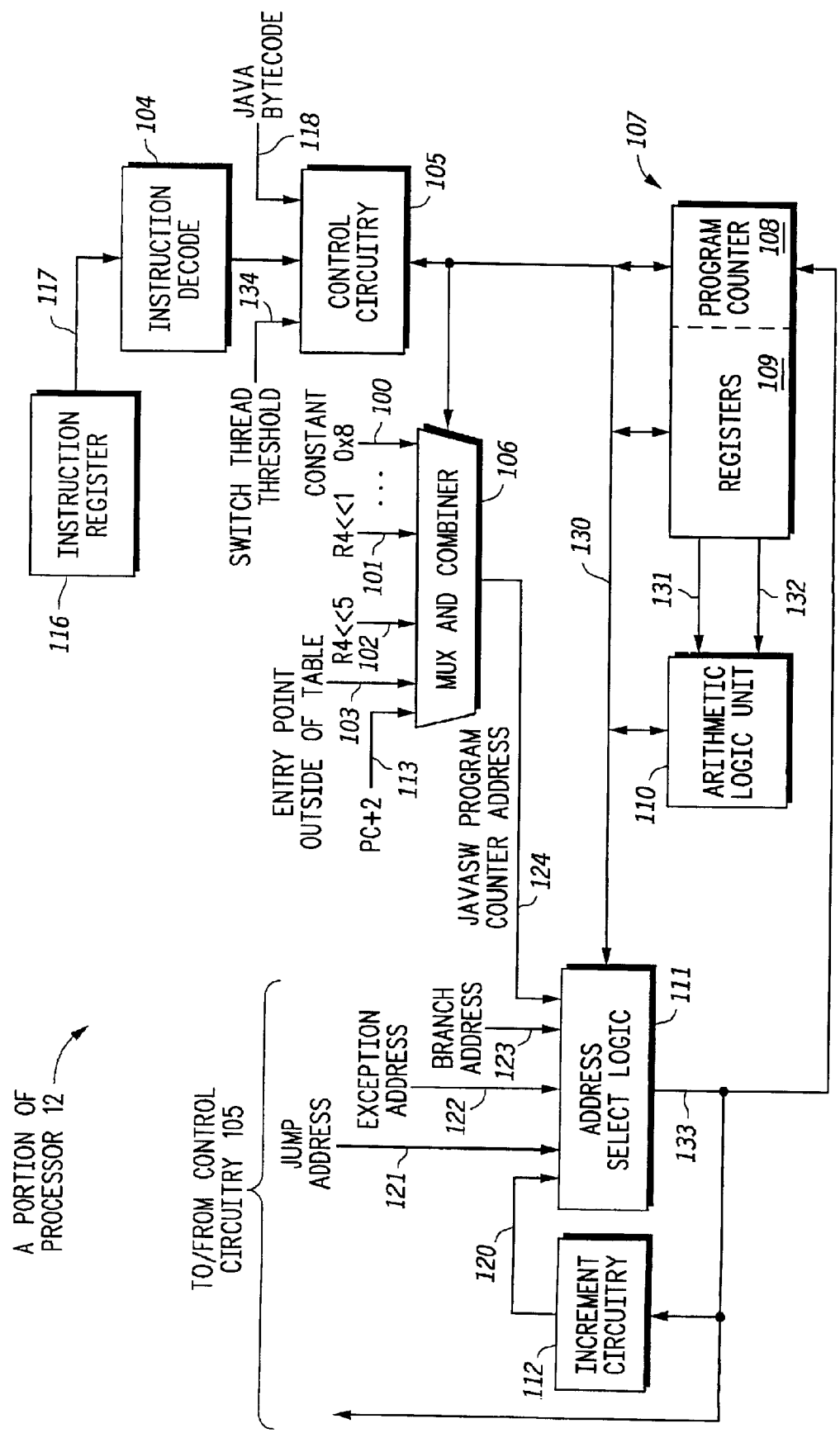
Figure 9:
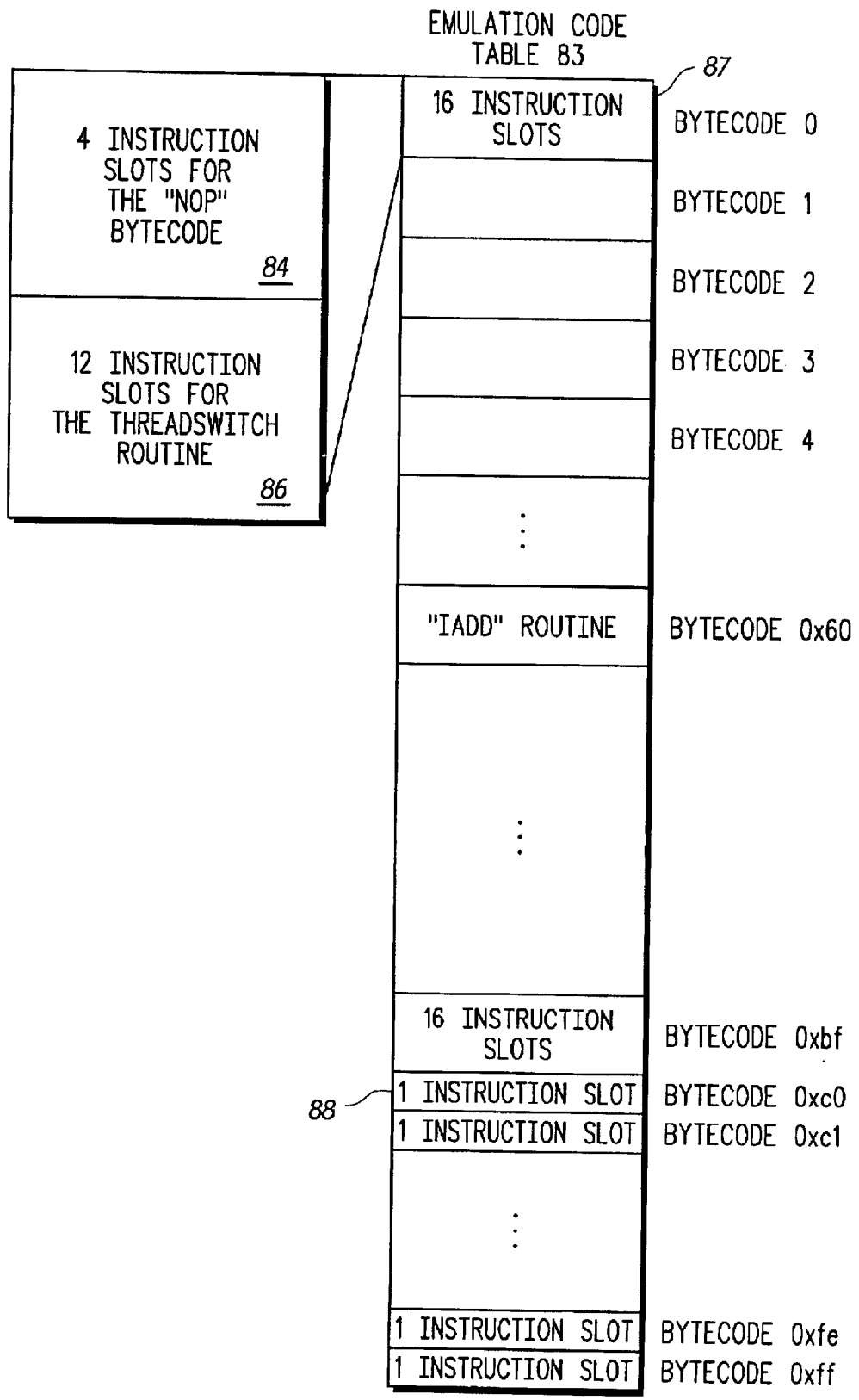

Illustrated in FIG. 3 is a known diagram of interpreter overhead associated with the Java program execution of FIG. 2;

Illustrated in FIG. 4 is a Java program and corresponding emulation code table when the program is executed in accordance with the present invention;

Illustrated in FIG. 5 is an example in accordance with the present invention of Java program execution which requires more emulation code than a group size permits;

Illustrated in FIG. 6 is an exemplary emulation code table showing one allocation of instruction slots in accordance with the present invention;

Illustrated in FIG. 7 is a Java interpreter instruction explanation for switching instruction flow in a Java program in accordance with the present invention;

Illustrated in FIG. 8 in block diagram form is a portion of the data processor of the system of FIG. 1 for implementing program execution in accordance with the present invention; and Illustrated in FIG. 9 is an exemplary emulation code table showing another allocation of instruction slots in accordance with the present invention.

DETAILED DESCRIPTION OF THE DRAWINGS

The present invention is illustrated by way of example and not by limitation in the accompanying figures, in which like references indicate similar elements. In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors that may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is logic level zero, the logically false state will be a logic level one. In the following description and diagrams, hexadecimal notation is used for some values by pre-pending the value with '0x'. Thus the value 0xff corresponds to a decimal value 255.

FIG. 1 is a block diagram that illustrates one embodiment of a data processing system 10 and includes a processor 12, a co-processor 14, a co-processor 16, a memory 18, other modules 20 and external bus interface 22 which are all bi-directionally connected by way of a bus 28. Alternate embodiments of the present invention may have only one co-processor 14, two co-processors 14 and 16 or even more co-processors (not shown). External bus interface 22 is bi-directionally coupled to external bus 26 by way of integrated circuit terminals 35. Memory 24 is bi-directionally coupled to external bus 26. Processor 12 may optionally be coupled external to data processing system 10 by way of integrated circuit terminals 31. Co-processor 14 may optionally be coupled external to data processing system 10 by way of integrated circuit terminals 32. Memory 18 may optionally be coupled external to data processing system 10 by way of integrated circuit terminals 33. Other modules 20 may optionally be coupled external to data processing system 10 by way of integrated circuit terminals 34. Processor 12 is bi-directionally coupled to both co-processor 14 and co-processor 16 by way of co-processor interface 30. The specific operation of processor 12 within data processing system 10 will be referenced below in the context of Java code execution.

Referring to FIGS. 2 and 3, an example will be given of a conventional execution flow of instructions in a Java program. An important performance issue in general with known interpreters is the fact that a significant amount of time is spent by the software in changing instruction flow and executing the interpreter overhead routine between each emulated Java bytecode. An illustration in FIG. 2 of instruction execution steps will highlight this point. Note that every identified step of steps one through seven in FIG. 2 requires a change of flow in the software program. In the prior art, one or more software routines such as interpreter overhead 54 must be repetitively jumped to and this creates additional interpreter overhead. FIG. 3 shows the same software routine as FIG. 2 but more clearly shows the relationship between the amount of time and software required to perform the interpreter overhead routine compared to the lesser amount of time and software required to execute the emulation code for various functions such as a, f and c. The interpreter overhead software includes fetching, decoding and dispatching a Java bytecode. Dispatching is the step performed to jump to the emulation code corresponding to an emulated Java bytecode. Note that the interpreter overhead also includes software to perform a counter function in order to determine when thread switching should occur. Note that the interpreter overhead 54 software also includes a virtual program counter for the Java Virtual Machine that must be kept updated. Note that FIG. 2 and FIG. 3 show both the Java program bytecodes and the emulation code table that is required by the processor (e.g. processor 12 of FIG. 1) in order to actually execute the bytecodes required by the Java program. Note that for each Java bytecode that is executed by processor 12, the code that is required to perform emulation of a Java bytecode requires two components. The first component is code to actually execute the function (a, f, c,), and the second component is a software routine that returns execution of the emulation code to the interpreter overhead 54 software. Referring to FIG. 3 note that the interpreter overhead software, illustrated with a bold line, may be a very significant portion of the software that is required to execute a Java bytecode. As a result, I am herein teaching a system and method that efficiently reduces the amount of software and time required to execute the interpreter overhead portion of the emulation code. It should be noted from FIG. 2 that the emulation code required to execute each function (a, f, c,) can and typically does vary significantly in size and is often a relatively small amount of code. In contrast, the interpreter overhead 54 software is a significant amount of code as compared to the emulation code required to execute a particular Java bytecode.

Referring now to FIG. 4, there is illustrated one example of a Java program 60 and its corresponding emulation code table 62 that may be executed by processor 12 of FIG. 1 in accordance with one embodiment of the present invention. Note that in the program execution embodiment of the invention illustrated in FIG. 4 each Java bytecode has a corresponding group in the emulation code table 62. In a generic sense, each group is correlated to a predetermined opcode of a program, as the present invention is not limited to use only with Java programs. Bytecode execution of bytecodes a, f, c . . . occurs by retrieval in emulation code table 62 of code in the order of steps 1, 2 and 3 as illustrated. In the particular embodiment of the invention illustrated in FIG. 4, each code group in the emulation code table 62, as defined by a Java bytecode hexadecimal value such as 0x0, 0x1, etc., contains sixteen of the processor 12 instructions. The number sixteen was chosen as a value that provides enough instruction slots to emulate most Java bytecodes, without causing excessive unused slots to be present. Some Java bytecodes will take less than sixteen processor 12 instructions to execute and some will take more. As a result, it should be well understood that alternate embodiments of the present invention may use any number of processor 12 instruction slots for each group. Also, the number of groups may vary according to the number of bytecodes required by the higher-level language. Note also that the interpreter overhead software is no longer required as a separate routine that must be jumped to by the emulation code. The interpreter overhead required by the prior art as shown in FIG. 2 has been replaced by a block of code used in each group that is labeled "Overhead plus JAVASW". Note that the "Overhead plus JAVASW" block of code is now distributed throughout the emulation code executed by processor 12. Note that the software flow illustrated in FIG. 4 and the emulation code table has fewer change of flow steps compared to the prior art illustrated in FIG. 2. It should be understood that a change of flow is one form of a change of control and that rather than implementing a jump instruction, the operation that may be performed may be another operation where a change of control is implemented, such as transferring between user and supervisor modes. The reduction in the change of flow steps provided by the present invention saves a significant amount of software overhead. It is important to note that the arrows illustrated in both FIG. 2 and FIG. 4 require additional software in order to carry out. Note that although each Java bytecode has been allocated sixteen instruction slots in the embodiment illustrated in FIG. 4, some particular Java bytecodes will not require all sixteen instruction slots. On the other hand some Java bytecodes require more than sixteen instruction slots in the emulation code. This example will be discussed in FIG. 5. Thus, FIG. 4 illustrates emulation code table 62 that can be executed by processor 12 of FIG. 1. In the illustrated form, code emulation table 62 has two hundred fifty-six equal sized groups allocated for the emulation of each Java bytecode as identified by hexadecimal addresses 0x0 through 0xFF. Thus the emulation code table illustrated in FIG. 4 provides a much more contiguous flow when a Java program is executed by processor 12. This more contiguous flow reduces the amount of software overhead required for the significant number of program flow changes required by the prior art (see FIG. 2).

Referring now to FIG. 5, FIG. 5 illustrates how the present invention may be used for a Java bytecode which requires more emulation code than the group size allows in emulation code table 63. Illustrated in FIG. 5 is an emulation code table 63. For the illustration shown in FIG. 5 assume that the initial portion of the emulation code begins at address 0x67 indicated by an arrow as step 1. Step 2 indicates that all sixteen instruction slots have been used and yet the corresponding bytecode requires additional emulation code. Thus, step 2 indicates that the emulation software flow must move to a new and available block of code in order to finish execution of the Java bytecode. In the example illustrated in FIG. 5, step 2 illustrates a redirection of program execution in the form of a jump of the emulation code to a location past the end of the original emulation code table 62 where a block of code may be located to complete execution of the Java bytecode. This additional code may be any size and is limited only by system resources. The additional code may be stored anywhere in a system where available resources exist to permit storage of the remaining Java bytecode emulation code to be executed. Therefore it should be understood that the selected jump address may be within a predetermined range (0x0 through 0xFF) of addresses which is less than a total range of addresses within the data processing system or the selected jump address may be outside of the predetermined range of addresses for storage anywhere available resources exist. Step 3 shows that once the emulation code for that particular Java bytecode has finished, the emulation code can jump back into any of the groups within the two hundred fifty-six groups at the location where the "Overhead plus JAVASW" software begins. Thus, the extra software required at the end of the emulation code table 63 to finish the Java bytecode emulation does not need to include the "Overhead plus JAVASW" software. This operational feature allows reuse of the "Overhead plus JAVASW" software portion of at least one group in the case where a Java bytecode cannot be emulated using only one group in the emulation code table 63.

Referring to FIG. 6, selecting the number of instruction slots allocated to each group is a significant issue. The selection usually involves a tradeoff between the total size of the emulation code table and the number of Java bytecodes that overflow beyond the group size. Although the embodiment illustrated in FIG. 6 uses sixteen instruction slots per group, alternate embodiments of the present invention may optimize the group size to a different number of instruction slots. Note that having a group size that is fixed greatly simplifies the address calculation used to point to the emulation code for each emulated bytecode. This may be a significant amount of computation time for processor 12 for each instruction and can significantly impact the overall performance of data processing system 10.

Still referring to FIG. 6, note that one or more hardware accelerators may be used as part of data processing system 10 (see FIG. 1, co-processors 14, 16) in order to improve the performance of data processing system 10. It should be well understood that a co-processor is just one type of hardware accelerator that may be used. Referring to FIG. 6, an IADD (integer add) routine has been illustrated in two ways in order to show how the emulation code table changes based on the presence or absence of a hardware accelerator. The integer add functionality is selected by way of example only. On the left of the "IADD" Routine of FIG. 6 is a software routine 80 that may be executed by processor 12 when a hardware accelerator is not present. The code 82 on the right illustrates a routine which may be executed by processor 12 when a hardware accelerator (e.g. co-processor 14), is present. Note that the hardware accelerator may be used to perform a significant portion of the execution of the Java bytecode. Comparing the left and right blocks of code in FIG. 6, it is apparent to see that a significant number of load and store instructions which previously had to be executed by processor 12, are no longer required when a hardware accelerator is used. As will be described in further detail in connection with FIG. 8, a user determinable control signal is provided in one form of the invention which permits a system user to select either a first emulation table structure of predetermined code size groupings or a second emulation table structure of differing predetermined code size groupings. Note that the hardware accelerator and the processor must have some type of interface or handshake mechanism in order to communicate and coordinate execution of a Java bytecode. Referring to FIG. 1, processor 12 and co-processors 14, 16 communicate by way of co-processor interface 30. Note that the communications between processor 12 and co-processors 14, 16 may be complicated by the fact that thread switching may occur in the Java program. During execution of a Java program at least a portion of the software must periodically check to determine if it is necessary to switch tasks and allow another task to have a portion of the processor 12 execution time. This switching or changing between software tasks in Java is called thread switching. Referring to FIG. 1, processor 12 conditionally signals to coprocessors 14, 16 whether a valid Java bytecode is to be executed or not, based upon whether or not thread switching is to occur. This signaling is part of the execution of the JAVASW instruction, and is conditional upon the fact that a thread switch is not being performed, since the co-processor should not execute a Java bytecode unless processor 12 is also executing the bytecode, and when a threadswitch is to be performed, the Java bytecode which would normally have been executed remains unexecuted until the current thread is restarted. Note that co-processor interface 30 may also include snooping or broadcast signals to allow processor 12 and coprocessors 14, 16 to have visibility into the software flow being performed by the other. For specific information regarding one of any known processor to co-processor interfaces that may be utilized with the present invention, reference can be made to U.S. Pat. No. 5,983,338 that is herein incorporated by reference.

Note that emulation code table 72 of FIG. 6 includes two hundred fifty-six addressable groups (0x0 through 0xff), where each group is allocated to a corresponding Java bytecode. It is desirable to locate the emulation code to implement the Java thread switching in the emulation code table. Due to the fixed number of instruction slots in each group, there is no unallocated memory location in the emulation code table 72 that is available to use for the thread switching software. Thus, it is necessary to use unused instruction slots within one or more groups to locate the thread switching code. In one embodiment of the present invention, the thread switching software routine is located in the first group that corresponds to Java bytecode zero (0). Since this group is allocated to the no-operation (NOP) instruction that requires, by way of example, only four instruction slots, there are twelve unused instruction slots remaining to store at least a portion of the software routine for performing thread switching. Note that if the thread switching routine does not fit within the allocated slots, a jump may be made to a location past the end of emulation code table 72 as was described in FIG. 5 for emulation code table 63. Alternate embodiments of the present invention may locate the software for performing thread switching in other locations within emulation code table 72. Note that using this first group in the emulation code table 72 to locate the thread switching software allows the hardware for implementing the JAVASW instruction (to be described further herein) to be implemented in a more straightforward manner using hardware in processor 12.

FIG. 7 illustrates further details of the "JAVASW" instruction previously referenced in the emulation tables of FIGS. 4 and 5. In one embodiment of the present invention, the JAVASW instruction is an instruction that is executed by processor 12 (see FIG. 1). For further clarity of the execution of the JAVASW instruction, a detailed portion of processor 12 from FIG. 1 is further provided in FIG. 8. Illustrated in FIG. 8 is an instruction register 116. Instruction decode 104 has an input for receiving a processor 12 instruction from instruction register 116 by way of conductors 117 connected to an output of instruction register 116, and an output connected to an input of a control circuitry 105. Control circuitry 105 also receives at an input 118 a Java bytecode to be executed. An output of control circuitry 105 is connected to a control input of a multiplexer (Mux) and combiner 106, to input/output terminals of registers 107 having a program counter 108 and other registers 109, to an input/output a, terminal of an arithmetic logic unit (ALU) 110, and to an input/output terminal of an address select logic 111 via conductors 130. Increment circuitry 112 has an output connected to a first input of address select logic 111 via conductors 120. A Jump Address 121 is connected to a second input of address select logic 111. An Exception Address 122 is connected to a third input of address select logic 111, and a Branch Address 123 is connected to a fourth input of address select logic 111. An output of Mux and combiner 106 is connected to a fifth input of address select logic 111 for providing a JAVASW Program Counter Address 124. Conductors 133 are connected to an input of increment circuitry 112, to an output of address select logic 111, and to an input/output terminal of program counter 108 for communication to and from control circuitry 105. Jump Address 121, Exception Address 122 and Branch Address 123 are provided by control circuitry 105. The Mux and combiner 106 has an input for receiving a Constant 0x8 100, an input having a value equal to R4<<1 (a value in a register R4 of registers 109 which is left-shifted by one) 101, an input having a value equal to R4<<5 (a value in register R4 of registers 109 which is left-shifted by five) 102, an Entry Point Outside of Table 103, and an input for receiving the program counter value plus 2 (PC+2). Control circuitry 105 has an additional input for receiving a Switch Thread Threshold value by way of one or more conductors 134.

Referring to FIG. 7, the operation of one embodiment of the JAVASW instruction is described in the form of 'quasi-C' code. In one embodiment, the JAVASW instruction causes a jump to a bytecode emulation sequence. An equation 92 illustrates the manner in which the address of this bytecode emulation sequence is calculated. The portion of equation 92 contained within brackets indicates the jump address that is loaded into program counter 108 (PC) of registers 107 during execution of the JAVASW instruction. This value is provided by Mux and combiner 106 in FIG. 8 to address select logic 111 by way of conductors 124. The value "PC+2" of equation 92 is the program counter value after program counter 108 has been incremented by increment circuitry 112. This incrementing occurs as a natural step in the execution pipeline of processor 12, and thus is convenient to use as a base address value. In other embodiments of the present invention, a non-incremented program counter value PC may be used instead. The incremented program value is then logically ANDed with the value 0xffffe000. This Boolean operation has the effect of forcing the low order thirteen bits of the value of (PC+2) to be forced to zero. The resulting address points to the first instruction slot of the first bytecode instruction group in emulation code table 72 (see FIG. 6). Note that in some embodiments of the present invention a logical AND may not be required. Instead, the low order thirteen bits of the value PC+2 may be truncated. If this pointer value is not truncated, it may be logically ORed with the Java bytecode value stored in Register R4 that is one of registers 109, shifted by an amount corresponding to the group size. This described operation effectively indexes the new program counter address into the correct location within emulation table 72 so that the program counter register now points to the beginning of the correct instruction group for the Java bytecode that is to be emulated by processor 12. An alternate method of forming the pointer value is to simply concatenate the high order eighteen bits of PC+2 with the Java bytecode value stored in Register R4 and then pad the result with 5 bits of zeros to form a 32 bit address. Note that the jump address may be formed in a wide variety of ways. However, regardless of the various techniques or combinations used to form the jump address, the result is always an address that points to the beginning of the correct instruction group within emulation code table 72 (see FIG. 6) that corresponds to the current Java bytecode. Note again that equation 92 is used to calculate the jump address if thread switching is not occurring. Note that thread switching does not occur if a statement 91 is true. Statement 91 is measuring whether a switch count (SWCOUNT) threshold (the point when a change of program tasks should be implemented by the data processing system) has been crossed in order to determine if a change to another Java thread should occur. Therefore, statement 91 requires a comparison determination of a value, such as a count value for example, with a predetermined value, the switch count threshold value. If statement 91 is true, there is a first result, and if statement 91 is not true there is a second result. However, if statement 91 is not true, then an "else" statement 93 results in an equation 94 being used to calculate the jump address which is stored in program counter 108. Note that the AND operation in equation 94 may be the same AND operation as described above in connection with equation 92. However, the OR operation of equation 94 is used to index into a portion of emulation code table 92 that contains the thread switching software. Again, note that if a truncation operation is used instead of an AND operation in equation 94, then the result of that truncation operation may be concatenated or combined with the offset to the thread switching software which is a constant 0x8. A statement 95 indicates that the JAVASW instruction then decrements the switch count value (SWCOUNT). It should be readily apparent that alternate embodiments of the invention may use an up counter instead of a down counter, or may keep track of the thread switching in some other manner, such as with a timer which allots a specific time before a switch is encountered. Although the embodiment illustrated in FIG. 7 selects the jump addresses in a very specific manner, alternate embodiments of the present invention may use other equations to implement equations 92 and 94 and statement 93. Although the illustrated embodiment of the present invention described uses specific addresses specified by equations 92 and 94 to jump to bytecode emulation sequences, alternate embodiments of the present invention may use equations 92 and 94 in modified form to jump to other desired addresses. Although the embodiment of the present invention illustrated in FIG. 7 describes a processor 12 instruction used to jump to a bytecode emulation sequence, alternate embodiments of the present invention may use an instruction of this type to jump to one of a plurality of jump destination addresses for a variety of different purposes. The present invention is thus not limited to a jump to a Java bytecode emulation sequence, but is applicable to other types of jumps. In addition, statements 91 and 93 may be any type of variable conditions that select one of a plurality of possible jump destination addresses. It should be further appreciated that statement 95 is optional and may not be used in some embodiments.

Instruction format 90 illustrated in FIG. 7 may also be referred to as an opcode. In the preferred form, instruction format 90 is held in instruction register 116, decoded by instruction decode 104 circuitry of FIG. 8, and consequently provided to control circuitry 105 in order to execute the JAVASW instruction in processor 12.

Note that the jump operation that is performed during the JAVASW instruction always occurs. The jump is not optional or conditional, but always occurs to one of a plurality of jump destination addresses.

Note also that R4<<5 indicates that a predetermined value, in this case the bytecode value, is left shifted by five bits before it is loaded into register R4. In the embodiment of the present invention illustrated in FIG. 7, each instruction is sixteen bits in length, thus occupying 2 bytes of storage. Note that a left shift of five bits is equal to a multiplication by 32 bytes, or sixteen instructions. Referring to FIG. 6, the reason the bytecode value is shifted by five, or multiplied by thirty-two, is to allow the offset into emulation code table 72 to index to the correct bytecode instruction group within emulation code table 72. Thus, the value R4<<5 is used to move the jump destination address pointer to the beginning of the correct group within emulation code table 72.

It should be realized that alternate embodiments of the present invention could include the implementation of the JAVASW instruction functionality using more than one instruction. Note that in one embodiment of the present invention the JAVASW instruction combines the ability to control a counter and to implement a table jump in a single instruction. This is shown in FIG. 7 as statement 95 that is performed in addition to one of equations 92 or 94. Note that for the JAVASW instruction a change of instruction flow is always taken, which is not the case for a conditional branch instruction. Note that the jump performed in response to the JAVASW instruction is to one of two addresses, both of which are within a predetermined table (see emulation code table 62 in FIG. 4). Additionally, in one embodiment of the present invention the JAVASW instruction performs a table jump operation where the destination of the table jump is a function of both the Java bytecode value and a counter value. In one embodiment of the present invention the counter value may be the switch count value (SWCOUNT in FIG. 7) used by the Java interpreter to determine when thread switching should occur. In one embodiment, one of registers 109 may be used as a counter. Alternate embodiments may use a combination of hardware or software and hardware in processor 12 to implement this switch counter function. For one embodiment of the JAVASW instruction, the counter value conditionally causes the normal entry point of the jump to be over-ridden with a predetermined fixed entry point back into the emulation table (illustrated as 0x8 in FIGS. 7 and 8). Alternate embodiments may use addresses other than 0x8. As illustrated in FIG. 7, the normal table entry point corresponds to the address calculation of the PC value determined by execution of equation 92, and occurs when no thread switching is to occur. When thread switching is to occur, the normal table entry point corresponding to equation 92 is not used. Instead, it is over-ridden with the entry point defined by equation 94, as a thread-switch should now be performed, and the emulation code for the Java bytecode that would normally have been emulated is no longer entered.

The JAVASW instruction provides an instruction that conditionally signals a hardware accelerator (e.g. co-processors 14, 16) via a handshake signal (part of co-processor interface 30) when a non-over-ridden table entry point is used. This handshake signal allows the hardware accelerator to determine whether processor 12 is executing equation 92 in FIG. 7 (in which case the bytecode is to be emulated by processor 12 and the hardware accelerator) or whether processor 12 is thread switching by executing equation 94 in FIG. 7 (in which case the hardware accelerator must not perform emulation of the current bytecode).

Additionally, the JAVASW instruction may provide a dispatch mechanism that allows the normal table structure shown in FIG. 6 to be over-ridden for a small set of bytecode values. For example, for a commonly executed Java bytecode that requires more than sixteen instruction slots, and thus would overflow the allocated group size, hardware may be provided which forces the JAVASW instruction to jump to a location which is outside of the emulation code table to execute the code required by the Java bytecode. Note that the only hardware required to implement such a dispatch mechanism is a small amount of decode logic to decode a selected set of Java bytecodes which would overflow their allocated instruction slots, and the additional input 103 to Mux and combiner 106 in FIG. 8 described below along with a corresponding control to allow the emulation code for this selected Java bytecode to jump to a location outside of the emulation code table. Note that this decode circuitry may be implemented within control circuitry 105 of processor 12 as is described below in connection with FIG. 8.

As noted earlier, FIG. 8 illustrates but one embodiment of the relevant portion of processor 12 of FIG. 1. To reiterate, the instructions used to emulate a Java bytecode are received by instruction decode circuitry 104 from instruction register 116. Instruction decode circuitry 104 decodes the emulation instructions and provides the decoded result to control circuitry 105. Control circuitry 105 provides control signals to other elements within processor 12 in order to execute these instructions. As indicated above, control circuitry 105 is bi-directionally connected to registers 107, arithmetic logic unit (ALU) 110 and address select logic 111 by way of conductors 130. Control circuitry 105 provides control signals to Mux and combiner 106. Alternate embodiments of the present invention may use more, fewer, or different inputs to Mux and combiner 106. The output of Mux and combiner 106 is a JAVASW program counter address 124 that is provided as an input to address select logic 111. Address select logic 111 also receives branch address 123, exception address 122, and jump address 121 as inputs. In addition, the output of address select logic 111 may be incremented by increment circuitry 112 and then fed back in as an input to address select logic 111 by way of conductors 120. In the illustrated embodiment of the present invention, increment circuitry 112 increments the address by two bytes, which is equivalent to one instruction. Alternate embodiments of the present invention may use increment circuitry 112 to increment the address by various amounts. The address output by address select logic 111 is provided to program counter 108 and to control circuitry 105 by way of conductors 133. Control circuitry 105 is used to generate jump address 121, exception address 122, and branch address 123. Control circuitry 105 receives one or more switch thread threshold signals by way of one or more conductors 134. As described above, registers 107 are bi-directionally connected to arithmetic logic unit 110 by way of conductors 130, 131, and 132.

In the illustrated form, the various inputs to Mux and combiner 106 provide a significant amount of flexibility to data processing system 10. Input 113 to Mux and combiner 106 provides the current PC+2 value from program counter 108 that is used to form various JAVASW program counter address 124 values in combination with other inputs to Mux and combiner 106. For example, the input 100 that provides the constant 0x8 can be used in combination with input 113 to force the JAVASW program counter address to point to the thread switching software routine 76 that is located in the first group of the emulation code table 72 in FIG. 6. This new program counter address will be used when the thread switching software is required. Input 101 to Mux and combiner 106 indicates that the contents of register R4 are left shifted one digit location and that shift is equivalent to multiplying by two. Input 101 is used to form the new program counter address when a group in emulation code table 72 contains a single instruction to store a jump address past the end of the emulation code table 72 where the emulation code to implement the corresponding bytecode is located. This functionality will be further illustrated in the description below of FIG. 9. Input 102 to Mux and combiner 106 indicates a left shift by five of the contents of register R4 which is equivalent to a multiply by 32. The left shifted value R4<<5 is used in combination with input 113 to select between groups in the emulation code table 72. Such a shift is an adjust that is performed to generate a new program counter address when processor 12 is finishing execution of a previous Java bytecode and transferring to execution of a next Java bytecode. Input 103 to Mux and combiner 106 allows the normal table structure to be overridden for a small set of bytecode values. In other words, an address outside of emulation code table 72 may be forced to a predetermined value by way of the Entry Point Outside Of Table 103 signal input to the Mux and combiner 106. Note that alternate embodiments of the present invention may have other inputs to Mux and combiner 106 which are used to create different new program counter addresses based on the needs of data processing system 10. Note that the inputs to Mux and combiner 106 may be used to vary the group sizes within emulation code table 72. Although the illustrated embodiment has been shown with one standard group size, alternate embodiments of the present invention may use a different group size or a plurality of group sizes defined by the inputs to Mux and combiner 106. This provides the user of data processor system 10 with a significant amount of flexibility in determining the length of code required to emulate various bytecodes of a high level language such as Java.

Referring now to FIG. 9, FIG. 9 illustrates a dispatch mechanism that allows an emulation code table to be compressed for a large group of bytecode values. As was discussed earlier in reference to FIG. 5, for some bytecode values, the corresponding emulation code may require more instruction slots than the group size provides. The overhead associated with step 2 and 3 in FIG. 5 may possibly be simplified if the emulation code remains in a contiguous sequence. Noting that for the Java bytecode encodings, a large percentage of bytecodes in the range 0xc0 to 0xff require more instruction slots than are provided with a group size of sixteen slots, an alternate emulation code table 83 in FIG. 9 may be desirable. Accordingly, FIG. 9 shows emulation code table 83 as a storage device which contains two hundred and fifty-six entries (one group per bytecode) in which the first one hundred and ninety-two entries (¾ of the entries) have a group size of sixteen instruction slots, (entries corresponding to bytecodes 0x0 through 0xbf), and the final sixty-four entries (¼ of the entries) have a group size of one instruction slot. By structuring the table in this manner, entries for bytecodes 0x0 through 0xbf are utilized as previously described with reference to FIGS. 5 and 6, while entries for bytecodes 0xc0 through 0xff contain a jump instruction to the actual emulation code for the corresponding bytecode. This structure allows the table to be compressed in size, and the emulation code for these more complex bytecodes can remain contiguous, rather than being divided into an initial portion and a final portion as was done in FIG. 5. This dispatch mechanism simplifies the code and reduces the overhead by removing the need for performing steps 2 and 3 in FIG. 5. Instead, an alternate step 2 is introduced which jumps directly to the entire emulation routine for a Java bytecode in the range 0xc0 through 0xff. Referring back to FIG. 8, this table compression is accomplished by utilizing input 101 to Mux and combiner 106 in conjunction with PC+2 input 113, and control circuitry 105. By scaling R4<<1, proper indexing into the bottom sixty-four entries of the table 83 is accomplished. The value PC+2 corresponding to input 113 of Mux and combiner 106 is modified to point to the beginning entry 88 of FIG. 9 by control circuitry 105 in response to decoding a bytecode in the range of 0xc0 through 0xff on input 118 to control circuitry 105. This modified value is then combined with R4<1 to select the proper table entry point in Mux and combiner 106. Control circuitry 105 may further implement a user determinable control signal through the use of the Java btyecode received at input 1118. The control signal selects either a first emulation table structure of predetermined group sizes or a second emulation table structure of predetermined group sizes and provides a user flexibility as to whether to operate with a storage device organized such as FIG. 5 or a storage device organized such as FIG. 9.

While the embodiment illustrated in FIG. 9 shows a particular selection of bytecodes 0xc0 through 0xff as bytecodes to have compressed table entries, alternate bytecode groups may be selected, or a different number of bytecodes may be selected for compressed table entries in accordance with the present invention.

By now it should be apparent that there has been provided a data processing instruction that combines and minimizes various aspects of the overhead associated with an interpreter loop. The instruction, in one form, may be stored on a storage medium either within an integrated circuit chip or independent and separate from an integrated circuit chip. The hardware support for the instruction allows optimization of memory used to implement the interpreter function. As a result, overhead in the form of execution time, amount of hardware resources required and amount of interpreter software required has been significantly reduced. The present invention combines controlling a counter and implementing a table jump wherein a change of flow is always taken. The JAVASW instruction implements the destination of a table jump as a function of both a bytecode value and a counter value, the counter value conditionally causing the normally calculated entry point in the table to be overridden with a predetermined fixed entry point. The JAVASW instruction also conditionally signals a hardware accelerator via a handshake signal when a thread switch is not being implemented. In the illustrated embodiment, a dispatch mechanism is provided which allows a normal memory structure to be overridden for a small set of bytecode values. There is also provided a dispatch mechanism that allows a memory table to be compressed for a large group of bytecode values. Additionally, the memory table may be configured to support multiple group sizes (e.g. 2, 8, 16 bytes, etc.) corresponding to simple and complex bytecodes. In such a bifurcation, the opcode (bytecode) is decoded and the code is selectively separated based on group size.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises", "comprising" or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of program execution in a data processing system comprising:
   means for fetching a first instruction located at a first address; and
   means for executing the first instruction with the data processing system, the method comprising:
   executing the first instruction;
   selecting a jump address based upon a value by providing a second address for the jump address if a comparison of the value with a predetermined value has a first result, and providing a third address for the jump address if the comparison of the value with the predetermined value has a second result, wherein neither the second address nor the third address is contiguous to the first address; and
   always implementing a change of control in the program execution in response to executing the first instruction by redirecting program execution to the jump address.

2. The method of claim 1 wherein the first result is a comparison determination that the value is greater than the predetermined value and the second result is a comparison determination that the value is less than or equal to the predetermined value.

3. The method of claim 1 further comprising:
   implementing the value that is compared with the predetermined value as a count value stored in a counter.

4. The method of claim 3 wherein implementing the value that is compared with the predetermined value as a count value in a counter further comprises:
   using the count value to track when a change of program tasks should be implemented by the data processing system.

5. The method of claim 1 further comprising:
   generating the jump address by maintaining a program counter having an address value which gets incremented during program execution and truncating a predetermined number of low order bits of the address value and combining a resultant with an offset to create the jump address.

6. The method of claim 1 further comprising:
   selecting the second address and the third address to be within a predetermined range of addresses that is less than a total range of addresses within the data processing system.

7. The method of claim 1 further comprising:
   selecting the second address to be within a predetermined range of addresses that is less than a total range of addresses within the data processing system.

8. The method of claim 1 further comprising:
   providing a storage device having a predetermined range of addresses for storing processing instructions to be executed by the means for executing, the processing instructions arranged in groups, each group correlated to a predetermined opcode of a program.

9. The method of claim 8 wherein the opcode is a Java bytecode.

10. The method of claim 8 further comprising:
    structuring the storage device in sections of a predetermined number of instruction slots, a predetermined amount of each of the sections dedicated to storage of the instructions.

11. The method of claim 8 further comprising:
    directing execution of the processing instructions from one of the sections of the storage device to an address outside of the predetermined range of addresses and subsequently redirecting program execution back to a predetermined portion of another one of the sections of the storage device.

12. The method of claim 1 further comprising:
implementing the value that is compared with the predetermined value as a timed value provided by a timer, the timed value restricting execution of each program task implemented by the data processing system to a predetermined amount of time.

13. A method of program execution in a data processing system comprising:
means for fetching a first instruction located at a first address; and
means for executing the first instruction with the data processing system, the method comprising:
executing the first instruction;
selecting a jump address based upon a value by providing a second address for the jump address if a comparison of the value with a predetermined value has a first result, and providing a third address for the jump address if the comparison of the value with the predetermined value has a second result, wherein neither the second address nor the third address is contiguous to the first address;
always implementing a change of control in the program execution in response to executing the first instruction by redirecting program execution to the jump address; and
providing a storage device having a plurality of processing instructions to be executed by the means for executing, at least one of the plurality of processing instructions causing a hardware accelerator to perform a processing function.

14. The method of claim 13 wherein the change of control in the program execution is signaled via a handshake signal from the means for executing the first instruction to the hardware accelerator.

15. The method of claim 13 wherein the change of control in the program execution is conditional based upon either the first result of the comparison or the second result of the comparison occurring.

16. The method of claim 1 further comprising:
providing a storage device having a predetermined range of addresses for storing processing instructions arranged in groups, at least two of the groups having differing numbers of processing instructions and thus differing sizes.

17. A method of program execution in a data processing system comprising:
means for fetching a first instruction located at a first address; and
means for executing the first instruction with the data processing system, the method comprising:
executing the first instruction;
selecting a jump address based upon a value by providing a second address for the jump address if a comparison of the value with a predetermined value has a first result, and providing a third address for the jump address if the comparison of the value with the predetermined value has a second result, wherein neither the second address nor the third address is contiguous to the first address;
always implementing a change of control in the program execution in response to executing the first instruction by redirecting program execution to the jump address; and providing a storage device having a predetermined range of addresses for storing the plurality of processing instructions arranged in groups, at least one of the groups containing a single instruction which causes a change of flow to a separate memory resource in the data processing system for permitting the storage device to be compressed in size, the separate memory resource containing processing suctions correlated to a predetermined opcode of a program.

18. A data processing system comprising:
a memory for storing a plurality of program instructions;
a processor coupled to the memory via a data bus for fetching the plurality of program instructions from the memory and selectively executing the plurality of program instructions; and
a storage device for storing a plurality of processing instructions to be executed by the processor, the plurality of processing instructions arranged in groups wherein each group is correlated to a predetermined one of the plurality of program instructions;
the processor executing a predetermined processing instruction at a predetermined address and selecting a jump address based upon a value by providing a first address for the jump address if a comparison of the value with a predetermined value has a first result, and by providing a second address for the jump address if the comparison of the value with the predetermined value has a second result, wherein neither the first address nor the second addresses address is contiguous to the predetermined address, execution of the predetermined processing instruction always implementing a change of control in program execution.

19. A data processing system comprising:
a memory for storing a plurality of program instructions;
a processor coupled to the memory via a data bus for fetching the plurality of program instructions from the memory and selectively executing the plurality of program instructions; and
a storage device for storing a plurality of processing instructions to be executed by the processor, the plurality of processing instructions arranged in groups wherein each group is correlated to a predetermined one of the plurality of program instructions;
the processor executing a predetermined processing instruction at a predetermined address and selecting a jump address based upon a value by providing a first address for the jump address if a comparison of the value with a predetermined value has a first result, and by providing a second address for the jump address if the comparison of the value with the predetermined value has a second result, wherein neither the first address nor the second addresses is of the predetermined processing instruction always implementing a change of control in program execution, wherein the value is one of a count value or a timer value, the value controlling when a thread switch between program threads is required.

20. A data processing system comprising:
a memory for storing a plurality of program instructions:
an instruction register coupled to the memory via a data bus for receiving the program instructions;
an instruction decoder coupled to the instruction register for decoding the program instructions into specific opcode values;
a control circuit coupled to the instruction decoder for providing control signals in response to the specific opcode values, the control circuit using a user determinable control signal that selects instruction group size;

address generation circuitry coupled to the control circuit for receiving the control signals and creating the jump address;

registers coupled to the address generation circuitry for storing operands in response to the control circuit;

an arithmetic logic unit coupled to the address generation circuitry and the control circuit, the arithmetic logic unit processing the operands stored by the registers;

a storage device for storing a plurality of processing instructions to be executed by the arithmetic logic unit, the plurality of processing instructions arranged in groups wherein each group is correlated to a predetermined one of the plurality of program instructions; and the arithmetic logic unit executing a predetermined processing instruction at a predetermined address and selecting a jump address based upon a value by providing a first address for the jump address if a comparison of the value with a predetermined value has a first result, and by providing a second address for the jump address if the comparison of the value with the predetermined value has a second result, wherein neither the first address nor the second address is contiguous to the predetermined address, execution of the predetermined processing instruction always implementing a change if control in program execution.

21. The data processing system of claim 20 wherein the user determinable control signal selects either a first structure of predetermined group sizes or a second structure of predetermined group sizes.

22. The data processing system of claim 20 wherein the address generation circuitry further comprises:

a multiplexer and combiner circuit coupled to the control circuit, the multiplexer and combiner circuit receiving at least one input signal that modifies the jump address.

23. A software processing instruction stored on a storage medium which, when executed by a data processor results in creation of a jump address, the jump address being based upon a value and is provided as one of either a first address or a second address, the first address being selected if a comparison of the value with a predetermined value has a first result, the second address being selected if the comparison of the value with the predetermined value has a second result, neither of the second and first addresses being contiguous to an address assignment of the software processing instruction, the software processing instruction always causing a change of control in program execution by redirecting program execution in the data processing system to the jump address.

* * * * *

UNITED STATES PATENT AND TRADEMARK OFFICE
CERTIFICATE OF CORRECTION

| | | |
|---|---|---|
| PATENT NO. | : 6,857,063 B2 | Page 1 of 1 |
| APPLICATION NO. | : 09/779886 | |
| DATED | : February 15, 2005 | |
| INVENTOR(S) | : William C. Moyer | |

It is certified that error appears in the above-identified patent and that said Letters Patent is hereby corrected as shown below:

In Column 16, Line 29, Claim No. 18:
    Change "the second addresses address" to --the second address--

In Column 16, Line 52, Claim No. 19:
    Change "the second addresses is," to --the second address is contiguous to the predetermined address, execution--

Signed and Sealed this

Twentieth Day of May, 2008

JON W. DUDAS
*Director of the United States Patent and Trademark Office*